United States Patent Office 3,388,763
Patented June 18, 1968

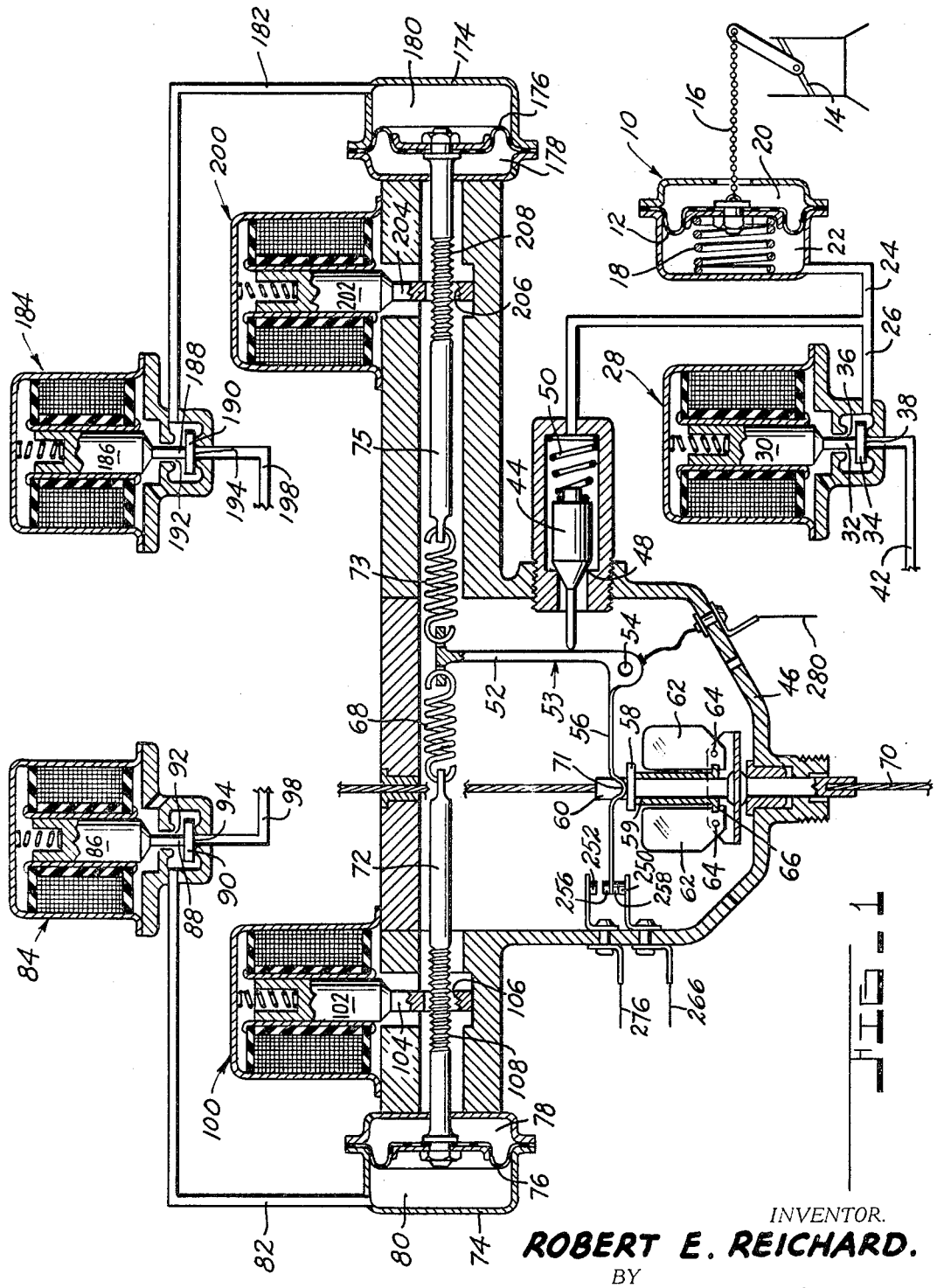

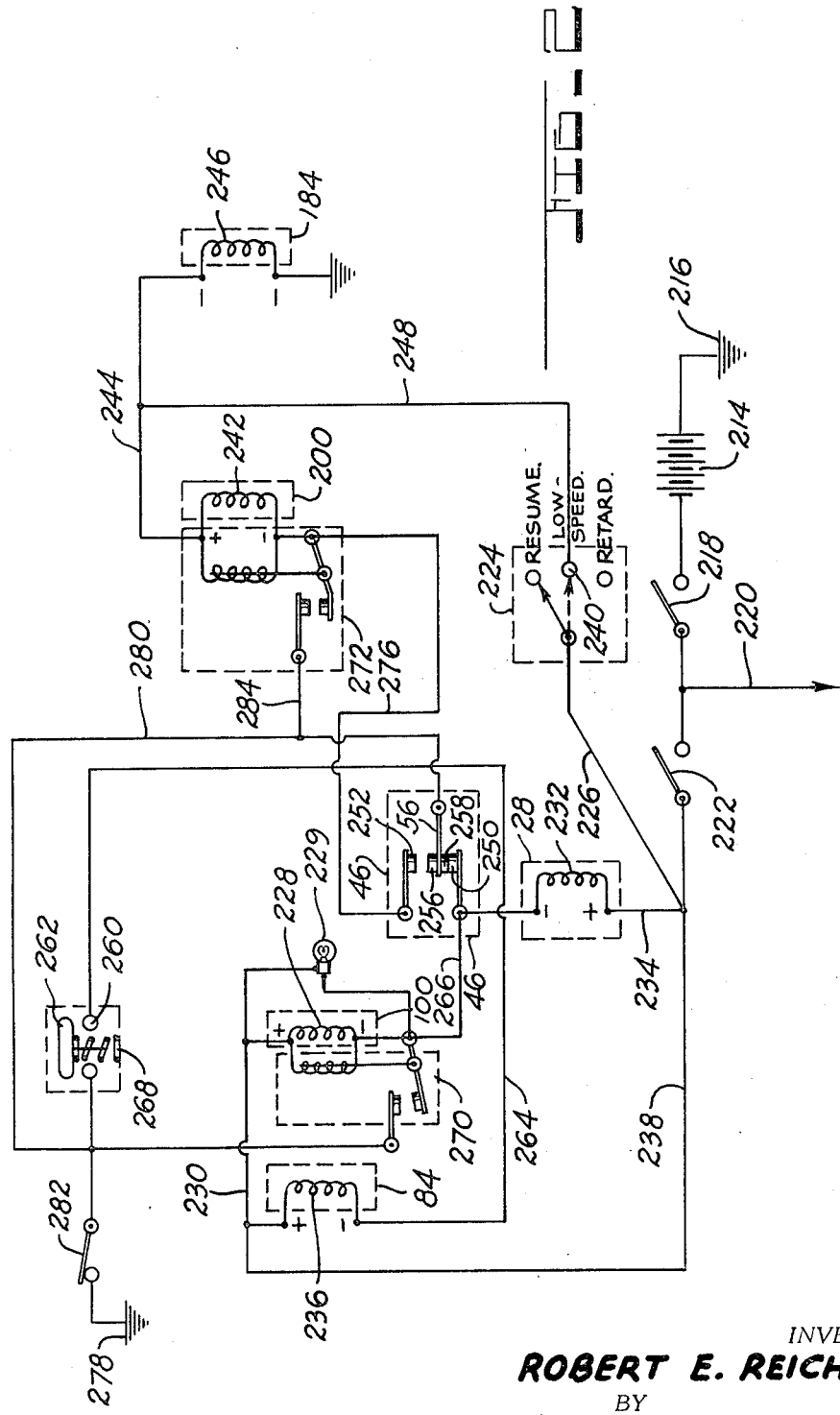

3,388,763
AUTOMOTIVE CRUISE CONTROL
Robert E. Reichard, South Bend, Ind., assignor to The
Bendix Corporation, a corporation of Delaware
Filed Oct. 3, 1966, Ser. No. 583,833
10 Claims. (Cl. 180—108)

This invention relates to a cruise control system for automatically controlling the speed of an automotive vehicle and more particularly to improvements in a cruise control system of the type disclosed in Cripe et al. Patent No. 3,207,252.

More particularly, it is an object of this invention to provide a cruise control system for use in conjunction with a brake retard system, such as that which is disclosed in copending application Ser. No. 533,885, filed Mar. 14, 1966, of common ownership with the present application. If the cruise control system disclosed in Patent No. 3,207,252 were utilized in conjunction with the retard system disclosed in application Ser. No. 533,-885, the system would function as follows: With the cruise control system actuated and set to control the vehicle speed at, for example, 70 m.p.h., if it is desired to slow down the vehicle temporarily without unlatching the 70 m.p.h. controlled speed setting of the cruise control system, actuation of a retard button or switch will bring into operation the vehicle power brake system and cause the vehicle to slow down at a pre-set deceleration. When the desired slower speed is reached and the retard button is released, the vehicle will start to coast. When it is desired to increase the vehicle speed to the original 70 m.p.h. speed setting, it is only necessary to actuate the resume switch and the vehicle will automatically return to the original controlled speed.

Accordingly, it is an object of this invention to provide a unique cruise control system for use in conjunction with a brake retard system which in effect is a two-speed cruise control system with the memory for the high speed setting. In other words, this cruise control system will permit the operator of a vehicle to drive the vehicle at a first high speed cruise control setting, slow down the vehicle to a second lower speed by actuation of the retard system, drive the vehicle at a second low speed cruise control setting, and upon actuation of a resume button by the operator automatically increase the speed of the vehicle to the first high speed setting.

Another object of this invention is to provide a two-speed cruise control system with a memory for the high speed setting which can be rendered operable after reaching the desired high speed solely by actuation of a high speed setting switch which automatically locks in the cruise control at said high speed and which can be rendered operable at a lower speed, after slowing down to said lower speed, by actuation of a low speed setting switch which automatically locks in the cruise control at said low speed.

The above and other objects, features and advantages of the invention will become apparent from the following description taken in connection with the accompanying drawings which form a part of this disclosure and in which:

FIGURE 1 shows a speed control system embodying the invention in which the pneumatic and electrical components thereof are schematically and diagrammatically illustrated; and FIGURE 2 shows a wiring diagram for use in conjunction with the speed control system of FIGURE 1.

Referring to FIGURE 1 of the drawings, it will be seen that the speed control system includes a vacuum power unit 10 having a throttle actuator diaphragm 12 therein which is suitably linked to the engine throttle 14 through conventional means such as chain 16. It will be understood that movement of chain 16 to the left will cause the throttle to open and increase the fuel supply to the engine, such movement being against a spring (not shown) which urges the throttle towards a closed position. A spring 18 is located within the vacuum power unit 10 and urges the diaphragm 12 to a throttle released position. The actuator diaphragm 12 has one side 20 thereof, continually open to atmosphere, while the other side 22 thereof is connected by conduits 24 and 26 to a primary three-way solenoid valve indicated generally by the numeral 28. The solenoid valve includes an armature 30 connected to a valve stem 32 on which is mounted a valve head 34. This valve has an air port 36 and a vacuum port 38 which is suitably connected to the engine intake manifold (not shown) via conduit 42.

A modulating valve 44 is located in governor housing 46 and is urged against its valve seat 48 by a spring 50. The modulating valve under certain conditions, as hereinafter described, will be unseated from its valve seat by movement of one arm 52 of a force transmitting V-shaped lever 53 which is pivotally connected to the governor housing at 54. The other arm 56 of the V-shaped lever is positioned above a flange 58 for contact therewith, said flange being formed on a sleeve 59 which is axially movable on governor shaft 60. Also located within the governor housing are two conventional centrifugal weights 62 which are operatively connected to a rotatable governor shaft in a suitable manner so that a predetermined speed will cause outward movement of the centrifugal weights about pivotal connections 64, said outward movement causing axial movement of sleeve 59 and flange 58 through contacting collar 66 which is formed on the other end of sleeve 59. Such axial movement of the sleeve 59 will cause lever 53 to pivot about pivotal connection 54 and thereby unseat modulating valve 44. Pivotal movement of V-shaped lever 53 about connection 54 is opposed by a high speed governor tension spring 68, one end of which is suitably connected to lever arm 52, and the other end of which is suitably connected to an axially movable rod 72. The tension of spring 68 is determined by the position of rod 72, said position being controlled in a manner to be subsequently described. The governor shaft 60 is suitably connected to a flexible shaft 70 which is adapted to be driven in timed relation with the speed of the vehicle, said flexible shaft preferably being the speedometer drive cable of the vehicle.

It will be understood that outward movement of the centrifugal weights 62 is opposed by the downward force or load exerted by lever arm 56 at point 71 against flange 58 of sleeve 59. The magnitude of this downward force is determined by the greater force or load exerted by the high speed governor spring 68 in a leftward direction and the counteracting lesser force or load exerted by the low speed governor spring 73. In other words, the resultant force exerted by the opposed governor tension springs 68 and 73 on the end of lever arm 52 determines the magnitude of the downward force exerted by lever arm 56 at point 71. This downward force at point 71 will, of course, determine the vehicle speed at which lever arm 52 will unseat modulating valve 44 and thus permit vacuum chamber 22 of power unit 10 to communicate with the atmosphere. The forces exerted by governor springs 68 and 73, respectively, are determined by high speed setting and low speed setting pneumatic systems which control the position of rods 72 and 75, respectively.

Specifically, the high speed setting pneumatic system includes a governor loading cylinder 74 having a diaphragm 76 therein which is suitably connected to rod 72 so that movement of the diaphragm will cause concomitant movement of the rod. One side of diaphragm 76, namely chamber 78, communicates continually with the atmosphere, whereas the other side of the diaphragm, namely chamber 80, is connected by conduit 82 to a three-way solenoid valve 84, which is similar to solenoid valve 28. Governor spring 68 will, of course, urge the diaphragm 76 towards the right. Solenoid valve 84 includes an armature 86, a valve stem 88, a valve head 90, an air port 92 and a vacuum port 94 which is suitably connected to the engine intake manifold (not shown) via conduit 98. Once rod 72 has been moved to the desired position by diaphragm 76, it can be locked in position by a locking solenoid mechanism indicated generally by the numeral 100. This locking solenoid includes an armature 102 and a locking member 104 having internal serrations 106 formed thereon for engaging the serrations 108 formed on the rod 72.

The low speed setting pneumatic system is similar to the high speed setting pneumatic system and includes a governor loading cylinder 174 having a diaphragm 176 therein which is suitably connected to rod 75 so that movement of the diaphragm will cause concomitant movement of the rod. One side of the diaphragm 176, namely chamber 178, communicates continually with the atmosphere, whereas the other side of the diaphragm, namely chamber 180, is connected by conduit 182 in a three-way solenoid valve 184. Governor spring 73 will urge the diaphragm 176 towards the left. Solenoid valve 184 includes an armature 186, a valve stem 188, a valve head 190, an air port 192 and a vacuum port 194 which is suitably connected to the engine intake manifold via conduit 198. Once rod 75 has been moved to the desired position by diaphragm 176, it can be locked in position by a locking solenoid mechanism indicated generally by the numeral 200. This locking solenoid includes an armature 202 and a locking member 204 having internal serrations 206 formed thereon for engaging the serrations 208 formed on the rod 75.

The electrical circuit for operating the cruise control system includes a battery 214 having one terminal grounded at 216 and the other terminal connected to an ignition switch 218. Other circuits lead from the ignition switch and are indicated generally by line 220. The cruise control circuit leads from the ignition switch to an on-off cruise control switch 222 and thence to a system select switch control 224 via conductor 226, to coil 232 of three-way solenoid valve 28 via conductor 234, to coil 236 of the high speed setting solenoid valve 84 via conductor 238, and to coil 228 of the high speed locking solenoid 100 via conductor 230. The low speed contact 240 of the system select switch 224 is connected to coil 246 of the low speed setting solenoid valve 184 via conductor 248, and to coil 242 of the low speed locking solenoid 200 via conductor 244.

Located within the governor housing 46 are fixed contacts 250 and 252, and associated movable contacts 256 and 258 which are suitably attached to the lever arm 56 of V-shaped lever 53. Pole 260 of single pole push button 262 is connected to coil 236 of the high speed solenoid valve 84 via conductor 264 and to normally closed brake pedal switch 282 which is grounded at 278. Spring 268 urges push button 262 to a position out of contact with pole 260. Conventional relays 270 and 272 are suitably connected, respectively, to high speed lock-in solenoid 100 and to low speed lock-in solenoid 200. Fixed contact 252 is connected to the low speed locking solenoid 200 and to the hold-in relay 272 via conductor 276. Fixed contact 250 is connected to high speed locking solenoid 100 and to the hold-in relay 270 via conductor 266. Movable contacts 256 and 258 are connected to the high speed hold-in relay 270 via conductor 280 and to the low speed hold-in relay 272 via conductor 284.

Operation of the two-speed cruise control system will be as follows: During manual operation of the vehicle at a given speed, for example 70 m.p.h., ignition switch 218 will be closed. If it is desired to place the vehicle under cruise control at the speed at which the vehicle is traveling, namely 70 m.p.h., all that is necessary is to close cruise control switch 222, place switch 224 in the "resume" position, and to actuate push button 262. With the vehicle traveling at 70 m.p.h., outward movement of the centrifugal weights 62 will have caused pivotal movement of V-shaped lever 53 and consequent engagement of movable contact 256 with fixed contact 252. Thus, when push button 262 is actuated and held in an actuated position, this will close the electrical circuit to the high speed setting solenoid valve 84 and cause energization of solenoid coil 236. Such energization will cause communication of vacuum with chamber 80 of the governor loading cylinder 74 to thereby increase the tension or load on governor spring 68 by causing movement of rod 72 in a leftward direction. When the tension or load on governor spring 68 reaches a value which causes a downward force on lever arm 56 which is sufficiently high to overcome the upward force on the lever arm 56 created by outward movement of the weights 62, the lever arm 56 will move in a downward direction until contact 258 engages contact 250. This will complete the electrical circuit to the high speed lock-in solenoid 100, through actuated relay 270, and will cause energization of solenoid coil 228. Upon energization of solenoid coil 228, a dash light 229 will go on and the push button 262 can be released. Upon release of the push button, actuated relay 270 will maintain the high speed lock-in solenoid 100 in an energized condition. Such energization of this lock-in solenoid will cause the internal serrations 106 of locking member 104 to engage the serrations 108 formed on the rod 72 and thus hold the diaphragm 76 and rod 72 in the position which will provide the necessary constant governor spring load for maintaining a 70 m.p.h. cruise control speed. This position of the diaphragm 76 will be maintained until the brake pedal switch 282, cruise control switch 222, or ignition switch 218 is opened. Load variation on the governor loading cylinder due to manifold vacuum change will not effect the control speed once the locking solenoid is engaged. As previously stated, a simple brake application will return the vehicle to manual control, in which event, the cruise control system will not be operative until the operator reactivates it by pressing push button 262.

The pneumatic system for controlling the speed of the vehicle by varying the throttle position is brought into operation by energization of solenoid coil 232 of the previously described solenoid valve 28. Such energization, which likewise occurs upon engagement of governor contacts 250 and 258, causes valve head 34 to block off air port 36 and open vacuum port 38 so that chamber 22 of vacuum power unit 10 will be communicated with vacuum. At this time, the resulting differential pressure across the diaphragm 12 will cause the diaphragm to move against spring 18 to a position which will maintain the throttle 14 through chain 16 at the necessary setting for maintaining the vehicle at the desired speed. Modulating valve 44, which is controlled by centrifugal weights 62, is responsive to variations in vehicle speed and regulates the degree of vacuum in chamber 22 of power unit 10 by communicating this chamber with atmosphere when it, the modulating valve, is open and preventing communication with atmosphere when it is closed. For example, if the speed of the vehicle increases as it descends a hill, increased movement of the centrifugal weights 62 in an outward direction will cause arm 52 of lever 53 to maintain the modulating valve 44 in an unseated position. Such a valve position will permit a regulated amount of atmospheric pressure to be communicated to the vacuum chamber 22 thereby causing a slight reduction in the amount of vacuum in this chamber. As a result, pressure responsive element 12 will move in a direction tending to close throttle 14 and reduce the fuel supply to the engine and consequently the speed of the vehicle. In effect, modulating valve 44 will continually move towards or away from its valve seat 48 as the speed of the vehicle tends to change because of variations in the road conditions.

When the system select switch control 224 is moved to its "retard" position, the vehicle will be slowed down to a lesser speed in the manner disclosed and claimed in co-pending application Ser. No. 533,885. At this time, contacts 250 and 258 will be in engagement. If the vehicle operator then desired to lock in the cruise control system at the lesser speed, for example 30 m.p.h., this can be done simply by moving control 224 to the "low speed" setting. When this is done, the electrical circuit is completed to the low speed setting solenoid valve 184 so that solenoid coil 246 thereof will be energized. Upon such energization, vacuum will be communicated to chamber 180 of governor loading cylinder 174 to thereby cause movement of diaphragm 176 and rod 75 towards the right. Such rightward movement will increase the tension or load on governor spring 73. As previously described, an increase in the load of governor spring 73 will reduce the magnitude of the downward force exerted by lever arm 56 at point 71 until this downward force at point 71 is equal to that force which is required to lock in the cruise control at the lesser speed at which the vehicle is traveling when the low speed circuit is closed. When the downward force at point 71 is of a magnitude which permits the centrifugal weights to move lever arm 56 upwardly so that contacts 256 and 252 are in engagement, the electrical circuit is completed to the low speed lock-in solenoid 200 through actuated hold-in relay 272. Such energization of this lock-in solenoid will cause the internal serrations 206 of locking member 204 to engage the serrations 208 formed on the rod 75 and thus hold the diaphragm 176 and rod 75 in the position which will provide the necessary governor spring load for maintaining a 30 m.p.h. cruise control speed.

If it is desired to slow down further, the "retard" switch can be actuated again until a slower speed is reached and the new "low speed" can be locked in. Placing the system select switch into the "resume" position release the low speed lock-in and the cruise control system returns to the original high speed setting or 70 m.p.h. speed. Momentary actuation of the brake pedal switch 282 or opening of the cruise control on-off switch 22 is sufficient to disable the cruise control and release all speed settings.

Although the invention has been shown as being operated by vacuum, which is available in the intake manifold of the engine of the vehicle, other pressure fluids which are available in an automotive vehicle may also be utilized. For example, in a vehicle powered by a gas turbine engine, the controlling medium could be compressor pressure rather than manifold vacuum. Accordingly, when the term "fluid pressure" is referred to in the claims, it is intended that such expression be broad enough to cover any suitable fluid pressure which is available in vehicles of this character and to include vacuum.

Furthermore, although this invention has been described in connection with a certain specific embodiment, it will be obvious to those skilled in the art that various changes may be made in the form, structure, arrangement of parts and electrical circuitry without departing from the spirit of the invention. Accordingly, I do not desire to be limited to the specific embodiment disclosed herein primarily for purposes of illustration, but instead desire protection falling within the scope of the appended claims.

Having thus described the various features of this invention, what I claim as new and desire to secure by Letters Patent is:

1. In a cruise control system for an automotive vehicle having an engine, a driver operated throttle control member for controlling the fuel supply to the engine, and a non-pedal actuated braking system for retarding the speed of the vehicle at a predetermined deceleration, a power unit having a pressure responsive element located therein, said pressure responsive element being operatively connected to said throttle control member for controlling movement thereof, fluid pressure means for causing movement of said pressure responsive element, modulating valve means operatively connected to said power unit for regulating and controlling the application of said fluid pressure to said pressure responsive element, speed responsive means operatively connected to said modulating valve means for controlling movement thereof at predetermined speeds, said speed responsive means including variable force means for determining the vehicle speed at which movement of said modulating valve means occurs, first manually operable actuating means for rendering said cruise control system operable at a desired first cruise control speed, first control means operatively connected to said variable force means and said first actuating means for varying and setting the effective force of said variable force means to that value which is necessary for automatic maintenance of vehicle speed at the speed occurring during actuation of said first manually operable means, means for retarding the speed of the vehicle to a second lower speed without rendering said cruise control system inoperable, second manually operable actuating means for rendering said cruise control system operable at a desired second cruise control speed, second control means operatively connected to said variable force means and said second actuating means for reducing and setting the effective force of said variable force means to that lower value which is necessary for automatic maintenance of vehicle speed at said second lower speed occurring during actuation of said second manually operable means, and means for deactivating said second actuating means to permit automatic control of said vehicle speed by said cruise control system at said first cruise control speed.

2. The combination as defined in claim 1 wherein said variable force means includes a force transmitting member operatively connected to said speed responsive means and said modulating valve means, said first control means includes first spring means operatively connected to said force transmitting member for exerting a first force thereagainst which will require a first predetermined vehicle speed to cause movement of said modulating valve, and said second control means includes second spring means operatively connected to said force transmitting member for exerting a force thereagainst tending to counteract said first force which will require a second lower predetermined vehicle speed to cause movement of said modulating valve.

3. The combination as defined in claim 2 which includes first loading means operatively connected to said first actuating means and said first spring means for varying and setting the force exerted by said first spring means and second loading means operatively connected to said second actuating means and said second spring means for varying and setting the force exerted by said second spring means.

4. In a cruise control system for an automotive vehicle having an engine, a driver operated throttle control member for controlling the fuel supply to the engine, and a non-pedal actuated braking system for retarding the speed of the vehicle at a predetermined deceleration, a power unit having a pressure responsive element located therein, said pressure responsive element being operatively connected to said throttle control member for controlling movement thereof, fluid pressure means for causing movement of said pressure responsive element, primary solenoid valve means for communicating said fluid pressure means with said pressure responsive element upon energization thereof, modulating valve means operatively connected to said power unit for regulating and controlling the application of said fluid pressure to said pressure responsive element, speed responsive governor means operatively connected to said modulating valve means for controlling movement thereof at predetermined speeds, said governor means including variable governor load means for determining the speed at which movement of said modulating valve means occurs, a first fluid pressure governor loading cylinder having a first pressure responsive member therein operatively connected to said governor load means for varying and setting the force exerted by said load means to a first predetermined value, first loading cylinder solenoid valve means for communicating said fluid pressure means with said first pressure responsive member upon energization thereof, first locking solenoid means operatively connected to said first pressure responsive member for permitting movement thereof when said first locking solenoid means is deenergized and preventing movement thereof when said first locking solenoid means is energized, first manually operable means for permitting energization of said primary solenoid valve means, said first loading cylinder solenoid valve means, and said first locking solenoid means, a second fluid pressure governor loading cylinder having a second pressure responsive member therein operatively connected to said governor load means for reducing and setting the force exerted by said load means to a second lower predetermined value, second loading cylinder solenoid valve means for communicating said fluid pressure means with said second pressure responsive member upon energization thereof, second locking solenoid means operatively connected to said second pressure responsive member for permitting movement thereof when said second locking solenoid means is deenergized and preventing movement thereof when said second locking solenoid means is energized, and second manually operable means for initially actuating said braking system for retarding the speed of the vehicle to a lower speed and subsequently energizing said second loading cylinder solenoid valve means and said second locking solenoid means while said vehicle is traveling at said lower speed.

5. The combination defined in claim 4 wherein said first manually operable means is connected to first, second and third control circuits, said first circuit including manually operable switch means arranged to energize said first loading cylinder solenoid valve means upon closure of said manually operable switch means, and said second and third circuits including governor switch means which upon closure will cause energization of said primary solenoid valve means and said first locking solenoid means.

6. The combination defined in claim 5 wherein said governor switch means is operatively connected to said governor load means and is closed when the vehicle reaches the speed for which the governor means is set by the position of the first loading cylinder pressure responsive member.

7. The combination defined in claim 6 wherein said second manually operable means includes a first control circuit having manually operable switch means for actuating said braking system to retard the speed of said vehicle, a second control circuit having manually operable switch means for energizing said second loading cylinder solenoid valve means, and a third control circuit including said governor switch means which upon closure will cause energization of said second locking solenoid means.

8. The combination as defined in claim 4 wherein said governor means comprises a centrifugally operated weight mechanism for moving said modulating valve to an open position at speeds above a predetermined value, and said governor load means of said governor means is operatively connected to said weight mechanism for determining the speed at which the modulating valve will be moved to an open position by said weight mechanism.

9. The combination as defined in claim 8 wherein said governor load means includes a force transmitting member for exerting a force against said weight mechanism tending to prevent movement of said mechanism, a first governor spring operatively connected to said force transmitting member and said first pressure responsive member of said first governor loading cylinder, and a second governor spring operatively connected to said force transmitting member and said second pressure responsive member of said second governor loading cylinder.

10. The combination as defined in claim 9 wherein said force transmitting member is a V-shaped lever having first and second arms pivotally connected at the juncture thereof to a fixed portion of said governor means, said first arm being in abutment with said weight mechanism and said second arm being attached to said first governor spring which exerts a force thereagainst in one direction and to said second governor spring which exerts a force thereagainst in the opposite direction.

References Cited
UNITED STATES PATENTS

| | | | |
|---|---|---|---|
| 3,183,994 | 5/1965 | Goerke et al. | 123—102 X |
| 3,195,672 | 7/1965 | Brennan | 180—105 |
| 3,207,252 | 9/1965 | Cripe et al. | 123—103 X |
| 3,268,026 | 8/1966 | MacDuff et al. | 180—106 |
| 3,339,664 | 9/1967 | Beyeridge et al. | 123—103 X |

KENNETH H. BETTS, *Primary Examiner.*